United States Patent
Gajre et al.

(10) Patent No.: US 11,539,689 B2
(45) Date of Patent: Dec. 27, 2022

(54) SYSTEM, METHOD, AND APPARATUS FOR AUTHENTICATING A USER DEVICE

(71) Applicant: Visa International Service Association, San Francisco, CA (US)

(72) Inventors: Vaibhav Prakash Gajre, Austin, TX (US); Veerabhadraiah Lingadhalli Matadha, Cedar Park, TX (US); Akon Samir Dey, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 11 days.

(21) Appl. No.: 17/152,010

(22) Filed: Jan. 19, 2021

(65) Prior Publication Data
US 2022/0232002 A1    Jul. 21, 2022

(51) Int. Cl.
*H04L 9/40*  (2022.01)
*H04L 9/08*  (2006.01)

(52) U.S. Cl.
CPC ........ *H04L 63/0838* (2013.01); *H04L 9/0863* (2013.01); *H04L 9/0861* (2013.01)

(58) Field of Classification Search
CPC ..... H04L 63/0838; H04L 9/0863; H04L 9/40; H04L 9/08; H04L 9/0861
See application file for complete search history.

(56) References Cited

U.S. PATENT DOCUMENTS

| | | | | |
|---|---|---|---|---|
| 9,002,750 | B1* | 4/2015 | Chu | H04W 12/04 705/72 |
| 2009/0328168 | A1* | 12/2009 | Lee | G06F 21/34 726/6 |
| 2013/0124292 | A1* | 5/2013 | Juthani | H04L 63/083 705/71 |
| 2014/0031514 | A1 | 1/2014 | Namiki et al. | |
| 2016/0080366 | A1* | 3/2016 | Agarwal | H04L 63/0838 726/6 |
| 2019/0034612 | A1* | 1/2019 | Smales | G06F 21/34 |
| 2022/0188400 | A1* | 6/2022 | Nassar | H04L 63/20 |

FOREIGN PATENT DOCUMENTS

KR    1020150124868 A    11/2015

OTHER PUBLICATIONS

Elliott, "Do you use SMS for two-factor authentication? Here's why you shouldn't", CNET, Apr. 8, 2020, retrieved from https://www.cnet.com/how-to/do-you-use-sms-for-two-factor-authentication-heres-why-you-shouldnt/, 4 pages.

(Continued)

*Primary Examiner* — Jayesh M Jhaveri
(74) *Attorney, Agent, or Firm* — The Webb Law Firm

(57) ABSTRACT

Provided is a method, system, and apparatus for authenticating a user device. The method includes registering a device identifier with at least one transformation rule, receiving a request for authentication comprising a device identifier associated with a user device, obtaining a one-time password (OTP) in response to receiving the request, communicating the OTP to the user device, receiving a transformed OTP from the user device, and authenticating the user device based on the OTP, the transformed OTP, and the at least one transformation rule.

20 Claims, 5 Drawing Sheets

(56) References Cited

OTHER PUBLICATIONS

Hoffman, "Message Encryption on Android", retrieved from https://smallbusiness.chron.com/message-encryption-android-32918.html, 2 pages.

Pereira, "Secure Android OTP & Account Verification using the SMS Retriever API", Jan. 7, 2019, retrieved from https://medium.com/nagoya-foundation/secure-android-otp-account-verification-with-the-sms-retriever-api-c395c1985fbf, 5 pages.

* cited by examiner

SYSTEM, METHOD, AND APPARATUS FOR AUTHENTICATING A USER DEVICE

BACKGROUND

1. Field

This disclosure relates generally to device authentication and, in particular embodiments, systems, methods, and apparatuses for registering user devices for authentication and for authenticating such user devices.

2. Technical Considerations

Systems may utilize two-factor authentication (2FA) to authenticate client devices. Some 2FA methods use text messaging (e.g., Short Message Service (SMS)) to convey a one-time password to the client device. However, there are several disadvantages with these methods. For example, hackers may be able to intercept an SMS message on a telephone network. Once intercepted, a hacker may be able to spoof messages from the authentication service because SMS messages are in plaintext and lack end-to-end encryption, such as SSL encryption. Moreover, mobile telephone numbers used to identify a user device may also be portable, allowing for hackers to gain information through social media or other like methods to port a mobile telephone number to another device. Other concerns include "shoulder surfing," in which hackers may find ways to view the screen of a user's device to obtain one-time passwords for use in authentication, and the risk of a device being lost or stolen.

SUMMARY

According to non-limiting embodiments or aspects, provided is a computer-implemented method, comprising: registering, with at least one processor, a device identifier with at least one transformation rule; receiving, with at least one processor, a request for authentication comprising a device identifier associated with a user device; obtaining, with at least one processor, a one-time password (OTP) in response to receiving the request; communicating, with at least one processor, the OTP to the user device; receiving, with at least one processor, a transformed OTP from the user device; and authenticating the user device, with at least one processor, based on the OTP, the transformed OTP, and the at least one transformation rule.

In non-limiting embodiments or aspects, the request for authentication is received from a service provider system. In non-limiting embodiments or aspects, the at least one transformation rule comprises at least one of the following: an algebraic function, a digit manipulation, a cryptographic function, or any combination thereof. In non-limiting embodiments or aspects, the OTP is communicated to the user device via a Short Message Service (SMS), and the transformed OTP is received from the user device via manual entry of the transformed OTP via a webpage or application. In non-limiting embodiments or aspects, the transformed OTP is communicated to the user device via a Mobile Originated (MO) message, and the OTP is received from the user device automatically via an application executed on the user device. In non-limiting embodiments or aspects, the device identifier comprises a telephone number corresponding to the user device. In non-limiting embodiments or aspects, registering the device identifier with the at least one transformation rule comprises: receiving, from the user device or a separate computing device, a registration request message comprising the device identifier and a user identifier; displaying, on the user device or a separate computing device, at least one graphical user interface configured to receive the at least one transformation rule from the user; communicating a Short Message Service (SMS) message comprising an initial OTP to the user device; receiving, from the user device, a responsive SMS message comprising an initial transformed OTP; generating a comparison OTP by applying the at least one transformation rule to the initial OTP; comparing the comparison OTP to the initial transformed OTP; and in response to determining that the comparison OTP matches the initial transformed OTP based on comparing, registering the device identifier with the at least one transformation rule in an authentication database.

According to non-limiting embodiments or aspects, provided is a system for authenticating a user device, comprising: at least one processor programmed or configured to: register a user identifier with at least one transformation rule; receive, from a user device, a request for authentication comprising the user identifier; obtain a one-time password (OTP) in response to receiving the request; communicate the OTP to the user device; receive a transformed OTP from the user device; and authenticate the user device based on the OTP, the transformed OTP, and the at least one transformation rule. In non-limiting embodiments or aspects, the request for authentication is received from a service provider system.

In non-limiting embodiments or aspects, the at least one transformation rule comprises at least one of the following: an algebraic function, a digit manipulation, a cryptographic function, or any combination thereof. In non-limiting embodiments or aspects, the OTP is communicated to the user device via a Short Message Service (SMS), and the transformed OTP is received from the user device via manual entry of the transformed OTP via a webpage or application. In non-limiting embodiments or aspects, the transformed OTP is communicated to the user device via a Mobile Originated (MO) message, and the OTP is received from the user device automatically via an application executed on the user device. In non-limiting embodiments or aspects, the device identifier comprises a telephone number corresponding to the user device. In non-limiting embodiments or aspects, registering the device identifier with the at least one transformation rule comprises: receiving, from the user device or a separate computing device, a registration request message comprising the device identifier and a user identifier; displaying, on the user device or a separate computing device, at least one graphical user interface configured to receive the at least one transformation rule from the user; communicating a Short Message Service (SMS) message comprising an initial OTP to the user device; receiving, from the user device, a responsive SMS message comprising an initial transformed OTP; generating a comparison OTP by applying the at least one transformation rule to the initial OTP; comparing the comparison OTP to the initial transformed OTP; and in response to determining that the comparison OTP matches the initial transformed OTP based on comparing, registering the device identifier with the at least one transformation rule in an authentication database.

According to non-limiting embodiments or aspects, provided is a computer program product for authenticating a user device, comprising at least one non-transitory computer-readable medium comprising one or more instructions that, when executed by at least one processor, cause the at least one processor to: register a user identifier with at least one transformation rule; receive, from a user device, a request for authentication comprising the user identifier; obtain a one-time password (OTP) in response to receiving the request; communicate the OTP to the user device; receive a transformed OTP from the user device; and authenticate the user device based on the OTP, the transformed OTP, and the at least one transformation rule. In non-limiting embodiments or aspects, the request for authentication is received from a service provider system.

In non-limiting embodiments or aspects, the at least one transformation rule comprises at least one of the following: an algebraic function, a digit manipulation, a cryptographic function, or any combination thereof. In non-limiting embodiments or aspects, the OTP is communicated to the user device via a Short Message Service (SMS), and the transformed OTP is received from the user device via manual entry of the transformed OTP via a webpage or application. In non-limiting embodiments or aspects, the transformed OTP is communicated to the user device via a Mobile Originated (MO) message, and the OTP is received from the user device automatically via an application executed on the user device. In non-limiting embodiments or aspects, registering the device identifier with the at least one transformation rule comprises: receiving, from the user device or a separate computing device, a registration request message comprising the device identifier and a user identifier; displaying, on the user device or a separate computing device, at least one graphical user interface configured to receive the at least one transformation rule from the user; communicating a Short Message Service (SMS) message comprising an initial OTP to the user device; receiving, from the user device, a responsive SMS message comprising an initial transformed OTP; generating a comparison OTP by applying the at least one transformation rule to the initial OTP; comparing the comparison OTP to the initial transformed OTP; and in response to determining that the comparison OTP matches the initial transformed OTP based on comparing, registering the device identifier with the at least one transformation rule in an authentication database.

Further embodiments or aspects are set forth in the following numbered clauses:

Clause 1: A computer-implemented method, comprising: registering, with at least one processor, a device identifier with at least one transformation rule; receiving, with at least one processor, a request for authentication comprising a device identifier associated with a user device; obtaining, with at least one processor, a one-time password (OTP) in response to receiving the request; communicating, with at least one processor, the OTP to the user device; receiving, with at least one processor, a transformed OTP from the user device; and authenticating the user device, with at least one processor, based on the OTP, the transformed OTP, and the at least one transformation rule.

Clause 2: The computer-implemented method of clause 1, wherein the request for authentication is received from a service provider system.

Clause 3: The computer-implemented method of clauses 1 or 2, wherein the at least one transformation rule comprises at least one of the following: an algebraic function, a digit manipulation, a cryptographic function, or any combination thereof.

Clause 4: The computer-implemented method of any of clauses 1-3, wherein the OTP is communicated to the user device via a Short Message Service (SMS), and wherein the transformed OTP is received from the user device via manual entry of the transformed OTP via a webpage or application.

Clause 5: The computer-implemented method of any of clauses 1-4, wherein the transformed OTP is communicated to the user device via a Mobile Originated (MO) message, and wherein the OTP is received from the user device automatically via an application executed on the user device.

Clause 6: The computer-implemented method of any of clauses 1-5, wherein the device identifier comprises a telephone number corresponding to the user device.

Clause 7: The computer-implemented method of any of clauses 1-6, wherein registering the device identifier with the at least one transformation rule comprises: receiving, from the user device or a separate computing device, a registration request message comprising the device identifier and a user identifier; displaying, on the user device or a separate computing device, at least one graphical user interface configured to receive the at least one transformation rule from the user; communicating a Short Message Service (SMS) message comprising an initial OTP to the user device; receiving, from the user device, a responsive SMS message comprising an initial transformed OTP; generating a comparison OTP by applying the at least one transformation rule to the initial OTP; comparing the comparison OTP to the initial transformed OTP; and in response to determining that the comparison OTP matches the initial transformed OTP based on comparing, registering the device identifier with the at least one transformation rule in an authentication database.

Clause 8: A system for authenticating a user device, comprising: at least one processor programmed or configured to: register a user identifier with at least one transformation rule; receive, from a user device, a request for authentication comprising the user identifier; obtain a one-time password (OTP) in response to receiving the request; communicate the OTP to the user device; receive a transformed OTP from the user device; and authenticate the user device based on the OTP, the transformed OTP, and the at least one transformation rule.

Clause 9: The system of clause 8, wherein the request for authentication is received from a service provider system.

Clause 10: The system of clauses 8 or 9, wherein the at least one transformation rule comprises at least one of the following: an algebraic function, a digit manipulation, a cryptographic function, or any combination thereof.

Clause 11: The system of any of clauses 8-10, wherein the OTP is communicated to the user device via a Short Message Service (SMS), and wherein the transformed OTP is received from the user device via manual entry of the transformed OTP via a webpage or application.

Clause 12: The system of any of clauses 8-11, wherein the transformed OTP is communicated to the user device via a Mobile Originated (MO) message, and wherein the OTP is received from the user device automatically via an application executed on the user device.

Clause 13: The system of any of clauses 8-12, wherein the device identifier comprises a telephone number corresponding to the user device.

Clause 14: The system of any of clauses 8-13, wherein registering the device identifier with the at least one transformation rule comprises: receiving, from the user device or a separate computing device, a registration request message comprising the device identifier and a user identifier; displaying, on the user device or a separate computing device, at least one graphical user interface configured to receive the at least one transformation rule from the user; communicating a Short Message Service (SMS) message comprising an initial OTP to the user device; receiving, from the user device, a responsive SMS message comprising an initial transformed OTP; generating a comparison OTP by applying the at least one transformation rule to the initial OTP; comparing the comparison OTP to the initial transformed OTP; and in response to determining that the comparison OTP matches the initial transformed OTP based on comparing, registering the device identifier with the at least one transformation rule in an authentication database.

Clause 15: A computer program product for authenticating a user device, comprising at least one non-transitory computer-readable medium comprising one or more instructions that, when executed by at least one processor, cause the at least one processor to: register a user identifier with at least one transformation rule; receive, from a user device, a request for authentication comprising the user identifier; obtain a one-time password (OTP) in response to receiving the request; communicate the OTP to the user device; receive a transformed OTP from the user device; and authenticate the user device based on the OTP, the transformed OTP, and the at least one transformation rule.

Clause 16: The computer program product of clause 15, wherein the request for authentication is received from a service provider system.

Clause 17: The computer program product of clauses 15 or 16, wherein the at least one transformation rule comprises at least one of the following: an algebraic function, a digit manipulation, a cryptographic function, or any combination thereof.

Clause 18: The computer program product of any of clauses 15-17, wherein the OTP is communicated to the user device via a Short Message Service (SMS), and wherein the transformed OTP is received from the user device via manual entry of the transformed OTP via a webpage or application.

Clause 19: The computer program product of any of clauses 15-18, wherein the transformed OTP is communicated to the user device via a Mobile Originated (MO) message, and wherein the OTP is received from the user device automatically via an application executed on the user device.

Clause 20: The computer program product of any of clauses 15-19, wherein registering the device identifier with the at least one transformation rule comprises: receiving, from the user device or a separate computing device, a registration request message comprising the device identifier and a user identifier; displaying, on the user device or a separate computing device, at least one graphical user interface configured to receive the at least one transformation rule from the user; communicating a Short Message Service (SMS) message comprising an initial OTP to the user device; receiving, from the user device, a responsive SMS message comprising an initial transformed OTP; generating a comparison OTP by applying the at least one transformation rule to the initial OTP; comparing the comparison OTP to the initial transformed OTP; and in response to determining that the comparison OTP matches the initial transformed OTP based on comparing, registering the device identifier with the at least one transformation rule in an authentication database.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

Additional advantages and details of the invention are explained in greater detail below with reference to the exemplary embodiments that are illustrated in the accompanying schematic figures, in which.

DETAILED DESCRIPTION

Figure 1:
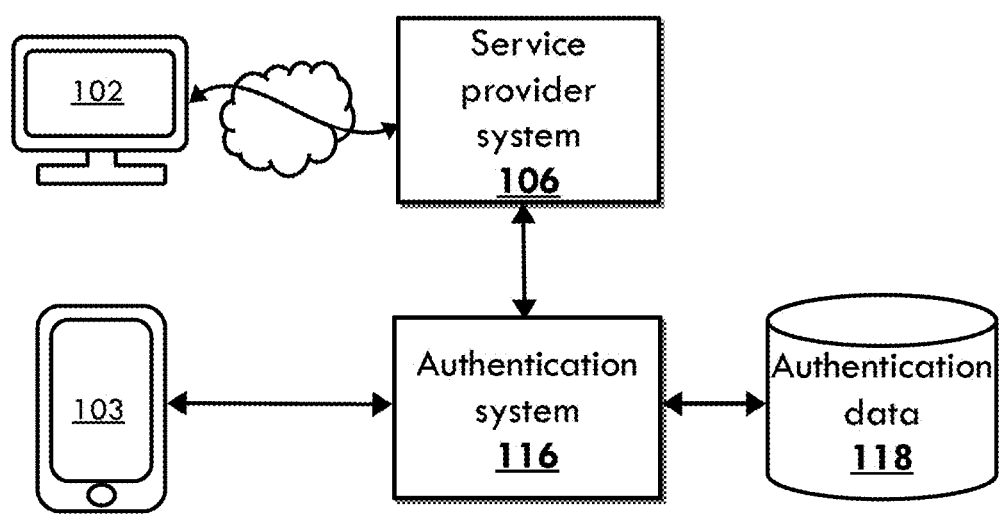
FIG. 1 is a schematic diagram of a system for authenticating user devices according to non-limiting embodiments.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the present disclosure. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computing devices operated by or on behalf of a transaction service provider, such as a transaction processing server executing one or more software applications. A transaction processing system may include one or more processors and, in some non-limiting embodiments, may be operated by or on behalf of a transaction service provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a payment device, such as a physical financial instrument, e.g., a payment card, and/or may be electronic and used for electronic payments. The term "issuer system" refers to one or more computing devices operated by or on behalf of an issuer institution, such as a server computer executing one or more software applications. For example, an issuer system may include one or more authorization servers for authorizing a transaction.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes.

As used herein, the term "merchant" may refer to an individual or entity that provides goods and/or services, or access to goods and/or services, to customers based on a transaction, such as a payment transaction. As used herein, the terms "merchant" or "merchant system" may also refer to one or more computer systems operated by or on behalf of a merchant, such as a server computer executing one or more software applications. As used herein, the term "point-of-sale (POS) system," may refer to one or more computing devices and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

Non-limiting embodiments provide for systems, methods, and apparatuses (e.g., computer program products) for authenticating devices that provide advantages over existing systems. For example, through the use of a transformed one-time password (OTP) and registration with an authentication system, a user device may be authenticated in a secure manner without interference by hackers.

Referring now to FIG. 1, a system 1000 for authenticating devices is shown according to a non-limiting embodiment. A user device 103 (e.g., a computing device) is in communication with an authentication system 116, which may include one or more computing devices configured to authenticate devices for one or more services (e.g., such as a service provider system 106). The authentication system may be part of a transaction processing system, payment gateway, and/or issuer system, or may be a separate authentication system. The authentication system 116 facilitates a user to authenticate himself or herself using a different device, such as computing device 102, to access service provider system 106. In non-limiting embodiments, the service provider system 106 may be any system seeking to authenticate the user and/or devices 102, 103, such as a bank, merchant, social media platform, and/or the like.

With continued reference to FIG. 1, in operation the user operating computing device 102 accesses a website or application for service provider system 106, such as logging into a merchant system for making a purchase. The service provider system 106 may include one or more computing devices, such as a server computer, and may request 2FA to authenticate the device 102. In particular, in response to a log-in attempt, the service provider system 106 may communicate an authentication request message to authentication system 116 identifying the user (e.g., including a user identifier, such as a name, telephone number, email address, and/or the like). In response to the authentication request message, the authentication service may generate an OTP and send it to the user device 103. In non-limiting embodiments, the user and/or user device 103 will transform the OTP received from the authentication system 116 and use that transformed OTP as an authentication input. For example, the transformed OTP may be input, via computing device 102 or user device 103, into a website or application of the service provider system 106. The service provider system 106 may then communicate the transformed OTP to the authentication system 116 which, in response, determines if the transformed OTP is accurate (e.g., by transforming the OTP according to the same transformation rules and comparing it to the received transformed OTP).

In non-limiting embodiments, and with continued reference to FIG. 1, the user initially registers with the authentication system 116 using device 103. Through a website or mobile application, for example, a user may specify one or more transformation rules and identification data (e.g., telephone number, name, email address, network (e.g., IP) address, device identifier, and/or the like). The one or more transformation rules may be uniquely defined by the user and/or selected from a predefined list of transformation rules. A transformation rule may include an algebraic function, a digit manipulation, and/or a cryptographic function, as examples. For example, a transformation rule may specify that a predefined number of digits (e.g., 3) is placed at a particular place in the OTP received (e.g., at the beginning, middle, or end). A transformation rule may also be a numerical manipulation of the OTP, such as adding, subtracting, multiplying, or dividing one or more digits of an OTP. For example, a transformation rule may specify that the value of "2" is subtracted from the last digit, such that an OTP reading "3040952" is transformed to "3040950".

In non-limiting embodiments, the authentication system 116 is configured to register a device 103, via a telephone number for example. Existing 2FA registration methods using SMS messaging involve the user device 103 providing a telephone number (e.g., a mobile number corresponding to the device 103) to the authentication system. The authentication system 116 then provides an OTP to the user device 103, which is read by the user and separately input to an application to enroll in 2FA. In operation, to access a system using 2FA, the user inputs credentials (e.g., such as user name, password, PAN, and/or the like) to access a service via the device 103 or a different device 102. The registered telephone number is sent an OTP in response to such credentials, and the user enters the OTP to be authenticated.

Figure 2A:
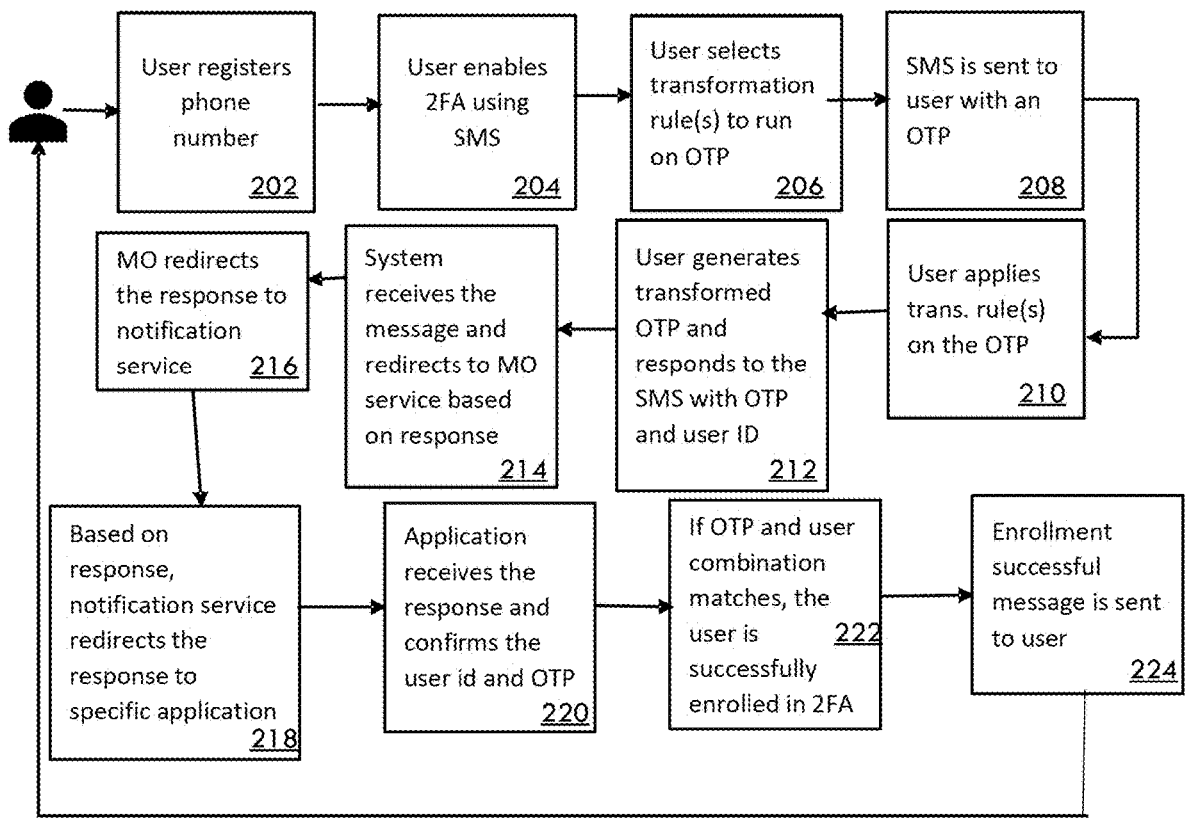
FIG. 2A is a flow diagram of a method for registering a user device for authentication according to non-limiting embodiments.

Referring now to FIG. 2A, a flow chart for a method for registering a device for authentication utilizing a Mobile Originated (MO) message service is shown according to a non-limiting embodiment. It will be appreciated that the steps shown in FIG. 2A are for example purposes only, and that additional, fewer, and/or alternative steps may be performed and in differing orders in non-limiting embodiments. At step 202, a user accesses an application or website on his or her user device 103 and inputs (e.g., registers) a telephone number. Through the application or website, at step 204 the user chooses one or more selectable options to opt-in to 2FA using SMS messaging. At step 206, the user, through one or more graphical user interfaces or other menus, inputs one or more transformation rules for an OTP. The transformation rules may be selected from a predefined list of transformation rules and/or may be customized by the user by inputting a rule (e.g., such as a logic statement). The transformation rule(s) inputted by the user may be stored in an authentication database in association with the telephone number.

At step 208 of FIG. 2A, an SMS message is communicated to the user device 103 with an OTP. The OTP may be uniquely generated by the authentication system 116 in any number of ways. At step 210, the user applies the one or more transformation rules inputted at step 206. Applying the one or more transformation rules may be performed by the user and/or by an application on the user device 103. For example, simple transformation rules involving transposing digits may be performed by a user, while complicated transformation rules may be determined by the user device 103. In some non-limiting embodiments, for example, an application executing on the user device 103 (e.g., such as an e-wallet, a merchant application, an issuer application, a service provider application, and/or the like) may automatically parse the SMS received, extract the OTP, and/or perform the one or more transformation rules on the OTP.

At step 212 a transformed OTP is generated and input into the user device in response to the SMS message received at step 208. A user identifier (e.g., user ID), such as a username, email address, and/or the like, may also be input by the user or automatically by the user device 103. In non-limiting embodiments, the user ID may be optional. The user ID, in some examples, may be mapped to a mobile phone number, such that the user ID can be identified based on the mobile phone number from which the response was received.

The transformed OTP and user identifier is communicated to the authentication system. In some non-limiting embodiments, an application executing on the user device 103 (e.g., such as an e-wallet, a merchant application, an issuer application, a service provider application, and/or the like) may automatically send the SMS message and/or automatically copy the OTP to a clipboard of the user device 103.

At step 214 of FIG. 2A, the authentication system 116 (e.g., such as an aggregator service of the authentication system) receives the responsive SMS message and redirects the SMS message to a MO message service of the authentication system 116. The MO message service, at step 216, redirects (e.g., forwards) the responsive SMS message (e.g., at least the transformed OTP) to a notification service of the authentication system 116. At step 218, based on the response, the notification service redirects (e.g., forwards) the responsive SMS message (e.g., at least the transformed OTP) to a specific application. For example, the specific application may be a service (e.g., a website) that the user seeks to access. At step 220, the application receives the responsive SMS message (e.g., at least the transformed OTP) and confirms the transformed OTP (and user identifier if that was also communicated). The transformed OTP may be confirmed by automatically applying, by the application and/or authentication system, the one or more transformation rules to the initial OTP generated at step 208 to generate a second transformed OTP, and then comparing the second transformed OTP to the transformed OTP received at step 214. The transformed OTP may also be confirmed by determining whether the combination of OTP and user identifier is correct, based on the authentication database.

At step 222, if it is determined that the transformed OTP is confirmed at step 220, the user device is automatically registered (e.g., enrolled) for 2FA for the application. A notification may be communicated to the user device 103 to indicate that registration (e.g., enrollment) in 2FA was successful at step 224. If it is determined that the transformed OTP is not confirmed (e.g., there is no match), then the authentication is declined and a failure response message is sent to the user device 103 via SMS. In some examples, a predetermined number of failures (e.g., 1, 2, 3, or the like) may cause the OTP to be expired (e.g., cancelled) in the authentication database such that a new OTP will have to be requested (e.g., the user will have to restart the process). In some examples, the OTP may be associated with an expiration time period during which the OTP must be used.

Figure 2B:
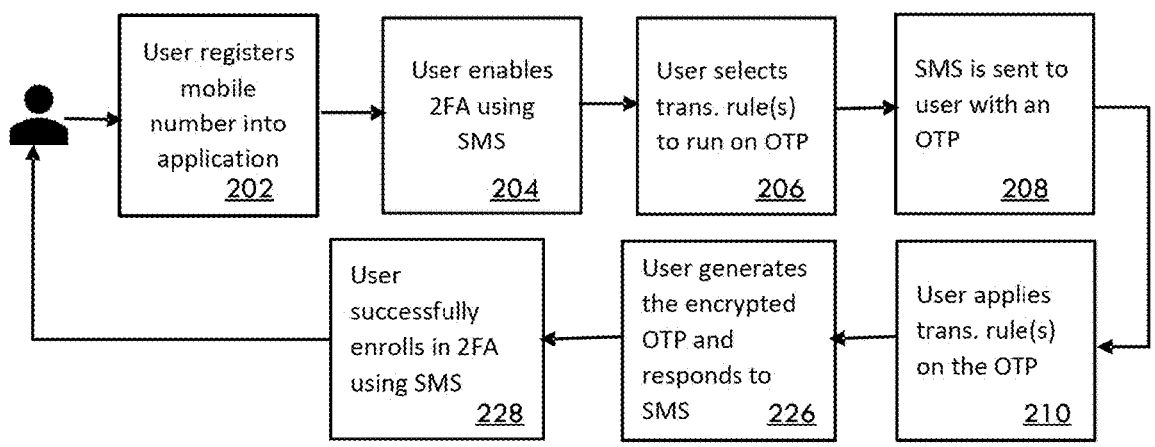
FIG. 2B is a flow diagram of a method for registering a user device for authentication according to non-limiting embodiments.

Referring now to FIG. 2B, a flow chart for a method for registering a device for authentication utilizing SMS is shown according to a non-limiting embodiment. It will be appreciated that the steps shown in FIG. 2B are for example purposes only, and that additional, fewer, and/or alternative steps may be performed and in differing orders in non-limiting embodiments. Steps 202-210 of FIG. 2B are as described above in relation to FIG. 2A. At step 226, rather than enter the transformed OTP into a responsive SMS message as discussed above in relation to step 212 of FIG. 2A, the user may respond via SMS message with the transformed OTP (e.g., in some cases the application which the user registers with at step 202). The system may then apply the one or more transformation rules on the generated OTP to generate a transformed OTP that is compared to the transformed OTP received from the user. At step 228, the user device is automatically registered (e.g., enrolled) for 2FA for the application in response to the comparison resulting in a match. A notification may be communicated to the user device 103 to indicate that registration (e.g., enrollment) in 2FA was successful.

In non-limiting embodiments, the one or more transformation rules may automatically expire within a predetermined time period (e.g., 90 days), such that the registration process shown in FIGS. 2A and 2B is performed again in response to the user attempting to authenticate his or her device for accessing a service.

Figure 2C:
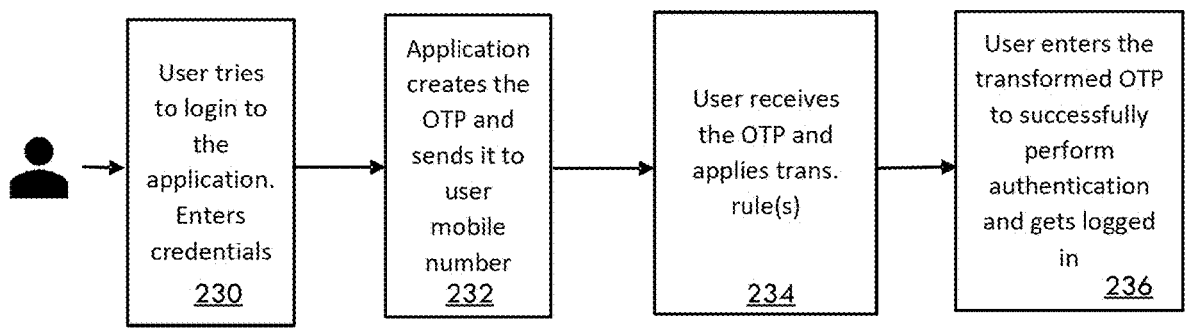
FIG. 2C is a flow chart for a method for authenticating a device according to non-limiting embodiments.

Referring now to FIG. 2C, a flow chart for a method for authenticating a device utilizing SMS is shown according to a non-limiting embodiment. It will be appreciated that the steps shown in FIG. 2C are for example purposes only, and that additional, fewer, and/or alternative steps may be performed and in differing orders in non-limiting embodiments. After being registered for authentication (see FIGS. 2A and 2B, for example), a user enters credentials (e.g., user name, password, PIN, PAN, and/or the like) into the application being accessed (e.g., such as a website) at step 230. The application then generates the OTP and communicates it to the user's device via SMS at step 232. The application (e.g., a network-based service) identifies the telephone number corresponding to the user's device from the information stored during the process of registering the device for authentication and uses this telephone number to send an SMS. At step 234, the user receives the OTP and applies the one or more transformation rules selected during registration. At step 236, the transformed OTP is input into the application (e.g., website) or is sent back as a response to the OTP message received by the user.

Figure 3:
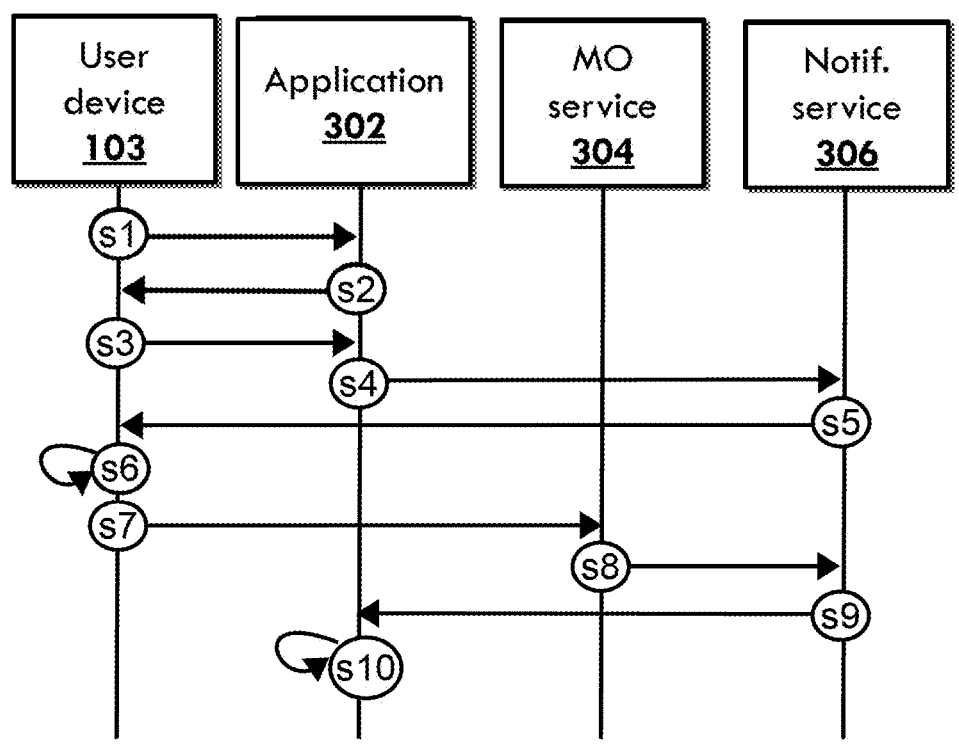
FIG. 3 is a sequence diagram of a method for authenticating user devices according to non-limiting embodiments.

Referring now to FIG. 3, a sequence diagram for a method for registering a device for authentication using an MO service is shown according to a non-limiting embodiment. The sequence diagram shown is for exemplary purposes only and additional, fewer, and/or alternative steps may be performed and in differing orders in non-limiting embodiments. The application 302, MO service 304 (e.g., any service that integrates with an SMS aggregator to receive SMS responses), and notification service 306 are components of an authentication system and/or related systems, such as a transaction processing system, issuer system, and/or the like. It will be appreciated that the steps shown associated with the application 302, MO service 304, and/or notification service 306 may be performed by an authentication system.

At step s1 of FIG. 3, the user device 103 communicates an enrollment request (e.g., registration request) to the application 302 via an SMS message that includes a telephone number for the user device 103. This communication may also include a user identifier, as an example, such as user credentials, an email address, and/or the like. In response, at step s2, the application 302 responds to the user device 103 by, for example, providing a plurality of transformation rules to choose from, by providing one or more user interfaces to input transformation rules and/or the like. At step s3, the user device 103 responds by communicating a selection of one or more transformation rules back to the application 302.

At step s4 of FIG. 3, the application 302 causes the notification service to, at step s5, communicate an OTP to the user device 103 via SMS message. At step s6, the user device 103 and/or user generates a transformed OTP and responds via SMS message at step s7. The SMS message may include the transformed OTP and a user identifier. In some examples, the transformed OTP and user identifier may be combined in a predetermined format, such as "[user ID]#[transformed OTP]" (e.g., with a delimiter between the values). Various other formats are possible. In some examples, the SMS message may be received by an aggregator service (e.g., an SMS aggregator) of the authentication system which then routes (e.g., forwards) the SMS message to the MO service based on a short code (e.g., a number or other identifier that uniquely identifies the entity from which the user receives the message, such as an identifier unique corresponding to the application 302, to assist the notification service to identify which application the received OTP message from the user should be forwarded to). At step s8, the MO service 304 will communicate the transformed OTP and the user identifier to the notification service 306. In some non-limiting examples, the application 302 may communicate directly with the aggregator service. Based on the short code, the notification service 306 at step s9 identifies the specific application being accessed and communicates the transformed OTP and the user identifier to the application 302. At step s10, the application 302 may confirm the transformed OTP and user identifier.

Figure 4:
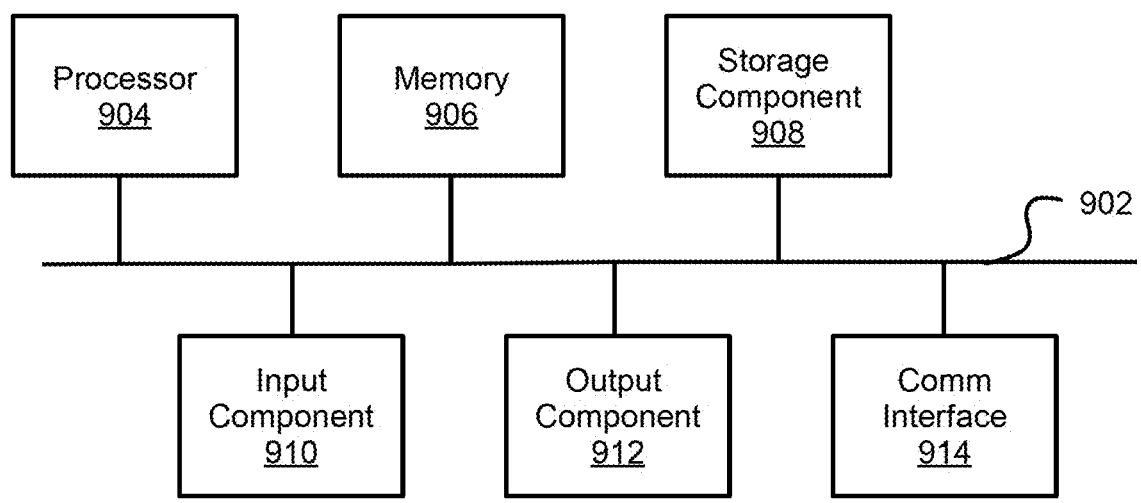
FIG. 4 illustrates example components of a device used in connection with non-limiting embodiments.

Referring now to FIG. 4, shown is a diagram of example components of a computing device 900 for implementing and performing the systems and methods described herein according to non-limiting embodiments. In some non-limiting embodiments, device 900 may include additional components, fewer components, different components, or differently arranged components than those shown in FIG. 4. Device 900 may include a bus 902, a processor 904, memory 906, a storage component 908, an input component 910, an output component 912, and a communication interface 914. Bus 902 may include a component that permits communication among the components of device 900. In some non-limiting embodiments, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), virtual or augmented reality depicting systems and devices, etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 4, storage component 908 may store information and/or software related to the operation and use of device 900. For example, storage component 908 may include a hard disk (e.g., a magnetic disk, an optical disk, a magneto-optic disk, a solid-state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although embodiments have been described in detail for the purpose of illustration, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment

What is claimed is:
1. A computer-implemented method, comprising:
registering, with at least one processor, a device identifier with at least one transformation rule;
receiving, with at least one processor, a request for authentication comprising a device identifier associated with a user device;
obtaining, with at least one processor, a one-time password (OTP) in response to receiving the request;
communicating, with at least one processor, a message comprising the OTP to the user device;
automatically parsing the message with an application executing on the user device;
automatically extracting the OTP from the message with the application executing on the user device;
automatically transforming the OTP with the application executing on the user device based on the at least one transformation rule to generate a transformed OTP, the at least one transformation rule configured to automatically expire within a predetermined time period;
receiving, with at least one processor, the transformed OTP from the user device; and
authenticating the user device, with at least one processor, based on the OTP, the transformed OTP, and the at least one transformation rule.

2. The computer-implemented method of claim 1, wherein the request for authentication is received from a service provider system.

3. The computer-implemented method of claim 1, wherein the at least one transformation rule comprises at least one of the following: an algebraic function, a digit manipulation, a cryptographic function, or any combination thereof.

4. The computer-implemented method of claim 1, wherein the OTP is communicated to the user device via a Short Message Service (SMS), and wherein the transformed OTP is received from the user device via manual entry of the transformed OTP via a webpage or application.

5. The computer-implemented method of claim 1, wherein the transformed OTP is communicated to the user device via a Mobile Originated (MO) message, and wherein the OTP is received from the user device automatically via an application executed on the user device.

6. The computer-implemented method of claim 1, wherein the device identifier comprises a telephone number corresponding to the user device.

7. The computer-implemented method of claim 1, wherein registering the device identifier with the at least one transformation rule comprises:
- receiving, from the user device or a separate computing device, a registration request message comprising the device identifier and a user identifier;
- displaying, on the user device or a separate computing device, at least one graphical user interface configured to receive the at least one transformation rule from the user;
- communicating a Short Message Service (SMS) message comprising an initial OTP to the user device;
- receiving, from the user device, a responsive SMS message comprising an initial transformed OTP;
- generating a comparison OTP by applying the at least one transformation rule to the initial OTP;
- comparing the comparison OTP to the initial transformed OTP; and
- in response to determining that the comparison OTP matches the initial transformed OTP based on comparing, registering the device identifier with the at least one transformation rule in an authentication database.

8. A system for authenticating a user device, comprising:
a memory
at least one processor programmed or configured to:
- register a user identifier with at least one transformation rule;
- receive, from a user device, a request for authentication comprising the user identifier;
- obtain a one-time password (OTP) in response to receiving the request;
- communicate a message comprising the OTP to the user device;
- automatically parse the message with an application executing on the user device;
- automatically extract the OTP from the message with the application executing on the user device;
- automatically transform the OTP with the application executing on the user device based on the at least one transformation rule to generate a transformed OTP, the at least one transformation rule configured to automatically expire within a predetermined time period;
- receive the transformed OTP from the user device; and
- authenticate the user device based on the OTP, the transformed OTP, and the at least one transformation rule.

9. The system of claim 8, wherein the request for authentication is received from a service provider system.

10. The system of claim 8, wherein the at least one transformation rule comprises at least one of the following: an algebraic function, a digit manipulation, a cryptographic function, or any combination thereof.

11. The system of claim 8, wherein the OTP is communicated to the user device via a Short Message Service (SMS), and wherein the transformed OTP is received from the user device via manual entry of the transformed OTP via a webpage or application.

12. The system of claim 8, wherein the transformed OTP is communicated to the user device via a Mobile Originated (MO) message, and wherein the OTP is received from the user device automatically via an application executed on the user device.

13. The system of claim 8, wherein a device identifier comprises a telephone number corresponding to the user device.

14. The system of claim 8, wherein registering a device identifier with the at least one transformation rule comprises:
- receiving, from the user device or a separate computing device, a registration request message comprising the device identifier and a user identifier;
- displaying, on the user device or a separate computing device, at least one graphical user interface configured to receive the at least one transformation rule from the user;
- communicating a Short Message Service (SMS) message comprising an initial OTP to the user device;
- receiving, from the user device, a responsive SMS message comprising an initial transformed OTP;
- generating a comparison OTP by applying the at least one transformation rule to the initial OTP;
- comparing the comparison OTP to the initial transformed OTP; and
- in response to determining that the comparison OTP matches the initial transformed OTP based on comparing, registering the device identifier with the at least one transformation rule in an authentication database.

15. A computer program product for authenticating a user device, comprising at least one non-transitory computer-readable medium comprising one or more instructions that, when executed by at least one processor, cause the at least one processor to:
- register a user identifier with at least one transformation rule;
- receive, from a user device, a request for authentication comprising the user identifier;
- obtain a one-time password (OTP) in response to receiving the request;
- communicate a message comprising the OTP to the user device;
- automatically parse the message with an application executing on the user device;
- automatically extract the OTP from the message with the application executing on the user device;
- automatically transform the OTP with the application executing on the user device based on the at least one transformation rule to generate a transformed OTP, the at least one transformation rule configured to automatically expire within a predetermined time period;
- receive the transformed OTP from the user device; and
- authenticate the user device based on the OTP, the transformed OTP, and the at least one transformation rule.

16. The computer program product of claim 15, wherein the request for authentication is received from a service provider system.

17. The computer program product of claim 15, wherein the at least one transformation rule comprises at least one of the following: an algebraic function, a digit manipulation, a cryptographic function, or any combination thereof.

18. The computer program product of claim 15, wherein the OTP is communicated to the user device via a Short Message Service (SMS), and wherein the transformed OTP is received from the user device via manual entry of the transformed OTP via a webpage or application.

19. The computer program product of claim 15, wherein the transformed OTP is communicated to the user device via a Mobile Originated (MO) message, and wherein the OTP is received from the user device automatically via an application executed on the user device.

20. The computer program product of claim 15, wherein registering the device identifier with the at least one transformation rule comprises:

receiving, from the user device or a separate computing device, a registration request message comprising the device identifier and a user identifier;

displaying, on the user device or a separate computing device, at least one graphical user interface configured to receive the at least one transformation rule from the user;

communicating a Short Message Service (SMS) message comprising an initial OTP to the user device;

receiving, from the user device, a responsive SMS message comprising an initial transformed OTP;

generating a comparison OTP by applying the at least one transformation rule to the initial OTP;

comparing the comparison OTP to the initial transformed OTP; and in response to determining that the comparison OTP matches the initial transformed OTP based on comparing, registering the device identifier with the at least one transformation rule in an authentication database.

* * * * *

UNITED STATES PATENT AND TRADEMARK OFFICE
CERTIFICATE OF CORRECTION

| | |
|---|---|
| PATENT NO. | : 11,539,689 B2 |
| APPLICATION NO. | : 17/152010 |
| DATED | : December 27, 2022 |
| INVENTOR(S) | : Vaibhav Prakash Gajre et al. |

It is certified that error appears in the above-identified patent and that said Letters Patent is hereby corrected as shown below:

In the Claims

Column 15, Line 25, Claim 8, delete "memory" and insert -- memory, --

Column 16, Line 37, Claim 15, delete "device:" and insert -- device, --

Signed and Sealed this
Fourteenth Day of March, 2023

Katherine Kelly Vidal
*Director of the United States Patent and Trademark Office*